Aug. 23, 1955      C. C. AUSTIN      2,715,853
COLLAPSIBLE STEREOSCOPIC VIEWER
Filed April 21, 1954      2 Sheets-Sheet 1
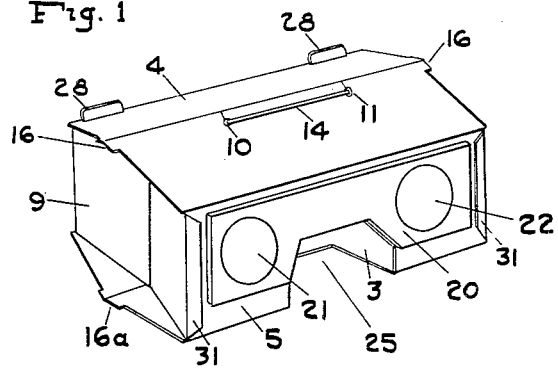
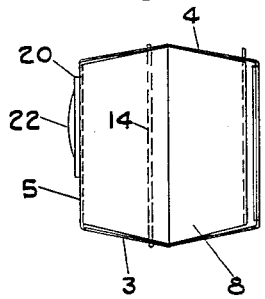
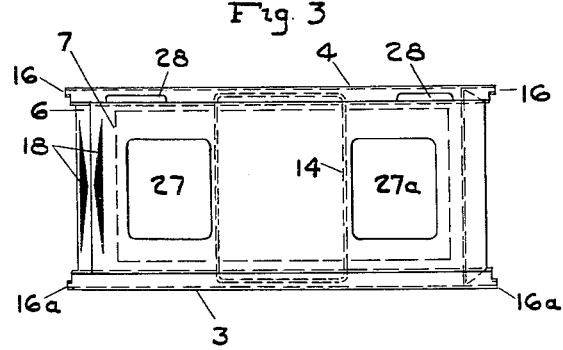
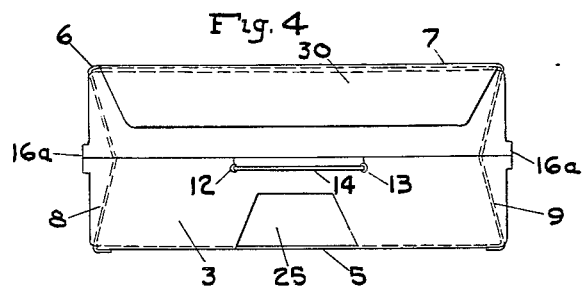
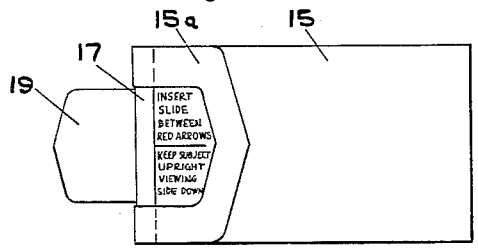
Inventor
Charles C. Austin
By Mark W. Jehan Aug. 23, 1955  C. C. AUSTIN  2,715,853
COLLAPSIBLE STEREOSCOPIC VIEWER
Filed April 21, 1954  2 Sheets-Sheet 2
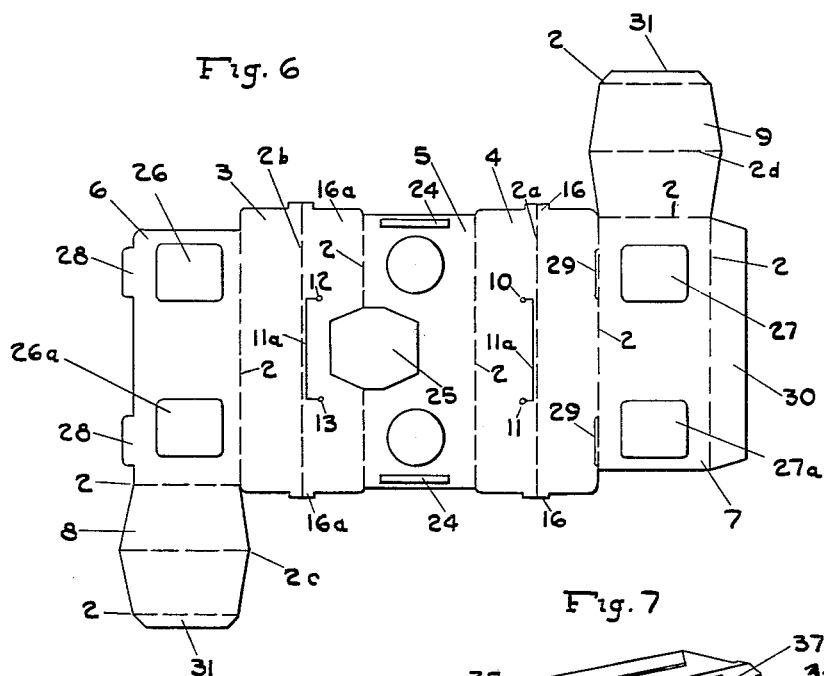
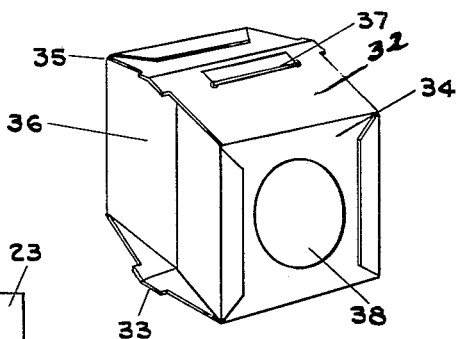
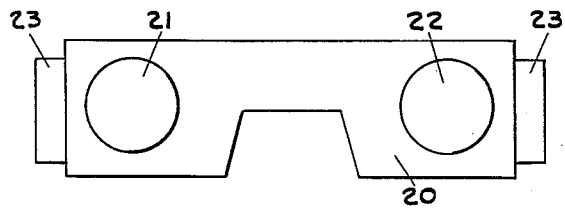
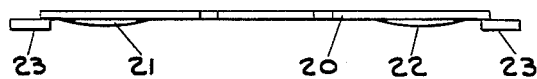
Inventor
Charles C. Austin
By Mark W Gehan United States Patent Office 2,715,853
Patented Aug. 23, 1955

2,715,853

COLLAPSIBLE STEREOSCOPIC VIEWER

Charles C. Austin, Minneapolis, Minn., assignor, by mesne assignments, to Viewmailer Company, Chicago, Ill., a corporation of Illinois Application April 21, 1954, Serial No. 424,613

10 Claims. (Cl. 88—29)

This invention relates to the viewing of translucent printed or pictorial slides and to a prefabricated package for transporting such slides in the mails. The invention provides a collapsible box-like device, which, while in collapsed position within a special mailing sleeve, is adapted to receive a slide (particularly of the stereoscopic variety) and be then sealed up for mailing. By reason of a unique self-erecting, pop-up feature of the box (hereinafter described in detail) it will, without further assembly work, expand to viewing position, ready for use, immediately upon removal of said mailing sleeve therefrom.

Although the article of the present invention has particular utility in respect to stereoscopic slides, its usefulness is not limited thereto, for the novel features of the device are of substantial value for the mailing and viewing of ordinary "single" transparencies. One embodiment of the invention is particularly designed for use with such standard variety of picture.

The popularity of stereoscopic pictures, and the manufacture of cameras for the taking of such pictures, has increased greatly over the past decade or so, for the complete realism of such pictures renders them more desirable to most persons. However, one feature which may have had some limiting effect upon growth in this field (particularly in the use of stereoscopic pictures for advertising purposes), is the fact that stereo pictures must be viewed in a special device in order for their particular effects to be achieved. Many people have felt that the use of stereoscopic pictures for advertising purposes has been retarded because advertisers have not been willing to provide prospective customers with stereoscopic slides of their products, in the absence of being assured that such prospects have means for viewing the pictures they will get.

One object of the present invention is to meet this difficulty and to provide a unit, suitable for mailing, into which an advertiser can insert a stereoscopic slide, said unit when opened, immediately and without further assembly work forming a stereoscopic viewer having the stereo slide within it in position set to be looked at. A further object of the present invention is to provide a stereoscopic viewer which is mailable as a relatively thin, flat package but which when opened by the user, will assume a box-like configuration without having to be put together by the user.

An additional object of the invention is to provide a handy mailable packet in which a person taking a stereoscopic picture, or other type of picture, may mail the same to a friend or relative with the assurance that (because of the self-erecting viewer forming part of the unit) the recipient will be able to utilize the slide without the necessity of having to assemble a number of parts, as has heretofore been the case in connection with prior viewers.

The article of the present invention is exceedingly simple to use. It is economical to manufacture, being die-cut from one single sheet of flexible material, such as cardboard. The device is easily assembled, and is attractive in appearance. The viewer is sufficiently durable so that it can be used for a considerable length of time, and, if desired, can be re-packaged in a suitable mailing sleeve, for mailing a second time. A principal advantage of the article of the present invention, over cardboard viewers heretofore known to me, is its "light proof" character; that is, its ability to exclude light from the interior of the box, when it is in assembled position. The present device has the further advantage of providing upon it ample room for advertising and instructional copy, and the arrangement of parts is such as to allow for the imprinting of an attractive design upon the exterior surface of the viewer. A further feature of my viewer lies in the ease with which a stereoscopic slide may be inserted within it, and the fact that said slide will be held securely in place during mailing. Another advantage of the viewer of this invention is the fact that it employs a single lens strip, extending along one face of the box. This unitary lens strip assures the fact that both lenses will be parallel to the slide. It also imparts considerable rigidity to the item, and lessens the likelihood that the lens elements proper will be dislodged from the viewer, and thereafter lost or misplaced. An additional advantage of the present article is the fact that it may be focused by finger pressure to accommodate the eyes of different users. It should also be noted that the mailing sleeve, forming part of the present invention is adapted to overlie the lens elements in the device, to guard the same against abrasion or scratching.

Other and further objects and advantages of the invention will appear, as the description thereof proceeds.

Referring now to the drawings,

Figure 1 is a perspective view of one embodiment of the present invention.

Figure 2 is an end view of the device shown in Figure 1.

Figure 3 is a rear elevational view thereof.

Figure 4 is a bottom view of the device.

Figure 5 is a side view of the mailing sleeve within which the device of Figure 1, in collapsed position, will normally be enclosed.

Figure 6 is a flat view of the die-cut blank from which the viewer of this invention is made up.

Figure 7 is a perspective view of a second, smaller, embodiment of this invention.

Figure 8 is a plan view of the lens strip shown on the viewer, in Figures 1 and 2.

Figure 9 is an edge view of the lens strip of Figure 8.

Referring first to Figure 6, there shown is the die-cut blank from which the article of Figure 1 may be folded. This blank may be cut from foldable plastic material, or from a reasonably heavy cardboard stock material. It is desirable that the surface of this blank which is to form the inner surface of the box should be of dark color. Broken lines 2 in Figure 6 represent scored lines along which said blank is folded during the assembly operation. Broken lines 2a—2d in Figure 6 are crease lines indicating portions of the box which have been scored to permit collapse of the box, in the manner more particularly described hereinafter. Although such fold and crease lines are not essential to fabrication of the article of this invention, the inclusion of them facilitates assembly, and are desirable, inasmuch as they may be included in the die-cut blank at no extra cost, during the stamping operation.

The portion of said blank designated by reference character 3 will, when said blank is folded, function as the bottom of the viewer. That portion of the blank designated as reference character 4 functions as the top of the viewer, when the same is assembled. Section 5 forms the front wall of the device, and sections 6 and 7 (which, when the viewer is folded, lie in face to face juxtaposition) form the double back wall thereof. Flaps 8 and 9 fold to form the end walls of the article. It will be noted that those flaps 8 and 9 are of greater width at their mid-portions than they are at either of their end portions. When the blank of Figure 6 is folded, as shown in Figure 1, for example, this feature results in the deforming of top member 4 and bottom member 3 from flat position, so that they become peaked along their crease lines 2a and 2b. In other words, as shown in Figure 2, the wider mid-portion of flap 8 spreads top 4 and bottom 3 away from each other, so that they will bend outwardly from each other during the collapsing operation. The wider mid-portion of flap 9 functions similarly, at the other end of the box. In assembly of the box, each of flaps 8 and 9 is bent inwardly, along crease lines 2c and 2d, so that top 4 and bottom 3 will overhang them, eave-like, and provide a light proof seal when the box is in expanded position. The maintenance of said flaps inwardly of the box (so that light will more surely be excluded from the interior thereof) is promoted by the fact that said flaps are higher at their mid-portions. This fact enables top 4 and bottom 3 to bear against said flaps to hold them bent within the box.

Top 4 is provided with spaced apart holes 10 and 11 and bottom 3 is formed with like holes 12 and 13, said latter holes being in position opposite from said first mentioned holes. Each pair of holes is associated with a slit 11a. Elastic member 14, which, for convenience, may consist of a rubber band, passes through the four of said holes and is strung out rectangularly as shown in Figure 3. This band 14 functions to draw top 4 and bottom 3 toward each other. Thus, when the viewer is in position as shown in Figure 1, for example, member 14 will serve to maintain the top and bottom of the device in close fit over side walls 8 and 9 so that no light will enter the viewing box. The particular arrangement and spacing of holes 10—13 is not critical, except that they should be placed so that member 14 will not obstruct the view of one using the device.

The viewer may be collapsed by pressing forwardly on front wall 5 toward the back wall of the device, or vice versa. When that is done, top 4 and bottom 3 will fold along crease lines 2a and 2b, and their mid-portions will move vertically away from each other. The mid-portions of side walls 8 and 9 will simultaneously be projected further inwardly of the box, when those side walls bend along crease lines 2c and 2d, and the front and back of the device will then come into adjacency.

Thus, the viewer may be made substantially flat and compact for mailing or such like. When the device is thus compressed, however, elastic member 14 will be under tension, and, as soon as the compressive forces on the front and back walls are relieved, said member will immediately serve to expand the viewer to operating position, as shown in Figure 1.

It is contemplated that my viewer in most instances will be marketed in flat position within a mailing sleeve. More specifically, it is contemplated that the viewer, after being folded and glued, will be compressed to flat position, in the manner above described. It will then be enclosed within mailing sleeve 15 (see Figure 5) and said sleeve will be maintained about the device by the sealing of outer flap 15a along the side of the sleeve. It will be noted that sleeve 15 is of width approximately equal to the distance between ears 16 and 16a on bottom 3 and top 4, and said ears serve to keep the sleeve aligned on the viewer, and prevent the same from sliding transversely off the device. Sleeve 15 is positioned about the collapsed viewer with sleeve opening 17 adjacent the entrance to the channel between back sections 6 and 7. The entrance to that channel is designated by arrows 18 in Figure 3. The slide is inserted into this channel, as indicated by said arrows. When one of the viewers of this invention is flattened, and placed within mailing sleeve 15, the viewer, within the sleeve, is then suitable for transmission through the mails. The slide is inserted into opening 17, and into the channel between arrows 18, so that the pictures on the slide will come into register with light transmitting openings 26—27a, hereinafter referred to. It will be noted that instructional wording for proper insertion of the slide into the packet is included on the face of the mailing envelope: see Figure 5. Flap 19 on sleeve 15 is then sealed shut, and the unit is then addressed and mailed. The recipient of the device slits mailing sleeve 15, whereupon the compressive forces on the viewer will be relieved and elastic member 14 will cause it immediately to pop open into viewing position.

Front wall 5 is provided with two circular apertures over which lens strip 20 is laid, and through which the user of the device looks. Lens strip 20 is made of one unitary piece of plastic material, upon which spaced lens elements 21 and 22 are formed. Each end of lens strip 20 is formed with a projecting flange member 23, by means of which said lens strip is maintained upon front wall 5. Each marginal edge portion of said front wall is provided with a rectangular cut out portion 24 into which flange member 23 or lens strip 20 are inserted. Said flange member 23 is maintained against the underside of front wall 5 by adhesive, or by any other convenient means. It will be apparent that other means for attaching lens strip 20 to front wall 5 could be employed. For example, said strip 20 could be formed with inwardly projecting bosses extending through front wall 5 and flattened against the inner surface thereof. I prefer that a unitary lens strip be used (rather than providing separate unattached lens elements 21 and 22) because I thereby am enabled to provide the viewer with a degree of rigidity which is desirable for viewing the slide, and also for mailing, shipping and storage of the box.

The bottom portion of front wall 5, and the front portion of bottom 3 are cut to form nose receiving aperture 25. This aperture enables a user of the device to bring lens elements 21 and 22 closer to the eyes than would be possible if said aperture were not provided. Said aperture should not be any larger than necessary to accommodate a human nose, so that no unnecessary light will be admitted to the interior of the box. Each of sections 6 and 7 which together form the double back wall of the device is provided with rectangular openings 26, 26a, 27 and 27a. Openings 27 and 27a are furnished with frosted light diffusing sheets. Openings 26 and 26a register with openings 27 and 27a when the device is in folded position, as shown in Figure 1. It is between sections 6 and 7 that the slide to be viewed is inserted. As indicated hereinabove, the slide is inserted at the entrance to the channel between said sections, which is indicated by arrows 18. It will be noted that section 7 (which lies outermost of section 6) is slightly shorter than section 6. Thus, its edge, by arrows 18, lies further inward of the box. There is thus provided easy means for insertion of the slide, for it can be located for insertion into the channel by resting its tip against the further projecting edge of back section 6.

Tabs 28, when the device is folded, project through slits 29. This arrangement serves to keep sections 6 and 7 in juxtaposition, as desired, for the engagement of said tips within said slits prevents inner wall 6 from moving away from outer wall 7. Tab 30 glued over bottom 3 also helps in this connection.

Tips 31 on end walls 8 and 9 are folded over and glued upon the face of front wall 5 when the box is assembled. These tips, together with tab 30, serve to keep the box in an assembled condition.

The construction of the embodiment shown in Figure 7 is very similar to that above described. The chief difference in the devices lies in the fact that the latter embodiment is of half size, containing only one lens element, one rectangular opening, etc. Functionally, however, the items are substantially identical. Top 32 and bottom 33 fold outwardly away from each other when front wall 34 is pressed toward back wall 35. Side wall 36 (and its opposed side wall) then simultaneously are thrust inwardly of the box. Elastic member 37 similarly serves to snap the viewer back to expanded position when the compressive pressures are released, and the device is used by looking through lens element 38 toward a rear double wall, carrying a translucent slide. This second embodiment of the invention, like the one described in greater detail hereinabove, may be focused by slightly compressing the front wall toward the back wall of the device, to bring lens element 38 closer to the slide being viewed.

It will, of course, be understood that although I have described in detail two particular embodiments of the invention, the invention will not be thus limited, but only insofar as defined by the scope and spirit of the appended claims.

What I claim is:

1. A collapsible device for viewing translucent printed or pictorial slides, comprising a box fabricated from relatively rigid material and having a top, a bottom, a front wall, a back wall, and opposed end walls, said end walls being attached to said front and back wall but free of said top and bottom, said top and bottom each overhanging said end walls and being provided with a crease line extending from end to end whereby each of said top and bottom will fold longitudinally outward as said front wall and back wall are brought toward each other, said end wall each being provided with a crease line whereby said end walls will fold vertically inward as said front wall and back wall are brought toward each other, an elastic member extending between said top and said bottom to keep said box normally in expanded condition with said front wall spaced apart from said back wall, said front wall being provided with at least one lens-carrying aperture, said back wall being provided with at least one light-transmitting window, said back wall incorporating a channel for carrying the slide to be viewed.

2. The device of claim 1 in combination with a mailing sleeve wrapped about said device to hold the same in collapsed condition, said sleeve being provided with an opening whereby a slide may be inserted within said device while said device is in collapsed condition within said sleeve.

3. A collapsible device for viewing translucent printed or pictorial slides, comprising a box fabricated from relatively rigid material and having a top, a bottom, a front wall, a back wall, and opposed end walls, said end walls being attached to said front and back wall but free of said top and bottom, said top and bottom each overhanging said end walls and being longitudinally bisected by a crease line, said end walls each being vertically bisected by a crease line, each of said members, by reason of said crease lines, folding upon itself as said front wall and said back wall are brought toward each other, said top and bottom folding outwardly of the box, said end walls folding inwardly of the box, an elastic member extending between said top and said bottom to keep said box normally in expanded condition with said front wall spaced apart from said back wall, said front wall being provided with at least one lens-carrying aperture, said back wall being provided with at least one light-transmitting window, said back wall incorporating a channel for carrying the slide to be viewed.

4. The device of claim 3 in combination with a mailing sleeve wrapped about said device to hold the same in collapsed condition, said sleeve being provided with an opening whereby a slide may be inserted within said device while said device is in collapsed condition within said sleeve.

5. A collapsible device for viewing translucent printed or pictorial slides, comprising a box having a top, a bottom, a front wall, a back wall, and opposed end walls, said end walls being attached to said front and back wall but free of said top and bottom, each of said end walls being of greater height at its vertical mid-portion than at either of its vertical edge portions, the mid-portion of each of said end walls normally being bent inwardly of the box along a vertical crease line, to be overhung by said top and bottom, each of said top and bottom being peaked along a crease line extending longitudinally from its end to its end, an elastic member extending between and drawing said top and bottom toward each other to lie snugly over said end walls, said box being collapsible by advancement of said front wall and said back wall toward each other whereupon each of said top, bottom and end walls will fold flat upon itself, said front wall being provided with at least one lens-carrying aperture, said back wall being provided with at least one light-transmitting window, said back wall incorporating a channel for carrying the slide to be viewed.

6. The device of claim 5 in combination with a mailing sleeve wrapped about said device to hold the same in collapsed condition, said sleeve being provided with an opening whereby a slide may be inserted within said device while said device is in collapsed condition within said sleeve.

7. A box-like device for viewing translucent printed or pictorial slides, said device being fabricated from relatively rigid material and having a top, a bottom, a front wall, a back wall, and opposed end walls, said top and bottom protruding outwardly over said end walls to overhang the same, each of said top and bottom being foldable outwardly upon itself and each of said end walls being foldable inwardly upon itself by advancement of said front wall and said back wall toward each other, said device being thereby collapsible to thin flat condition with said front wall and said back wall in close face to face adjacency, an elastic member urging said top and bottom toward each other to maintain said device in normally open box-like condition, said front wall being provided with at least one lens-carrying aperture, said back wall being provided with at least one light-transmitting window, said back wall incorporating a channel for carrying the slide to be viewed.

8. The device of claim 7 in combination with a mailing sleeve wrapped about said device to hold the same in collapsed condition, said sleeve being provided with an opening whereby a slide may be inserted within said device while said device is in collapsed condition within said sleeve.

9. In combination, a device for viewing translucent printed or pictorial slides, and a mailing sleeve therefor, said device being fabricated from relatively rigid material and having a top, a bottom, a front wall, a back wall, and opposed end walls, said top and bottom each overhanging said end walls, said top and bottom and said end walls all being creased to permit collapse of said device to thin, flat condition, said device being enclosed in collapsed condition within said sleeve with said front wall and said back wall in close face to face adjacency, each of said top and bottom, and each of said end walls then being folded in half upon itself, said top and bottom being folded outwardly of said device, said end walls being folded inwardly of said device, an elastic member urging said top and bottom toward each other, said elastic member functioning upon removal of said sleeve from said device to cause said device to pop open to box-like condition, said front wall being provided with at least one lens-carrying aperture, said back wall being provided with at least one light-transmitting window, said back wall incorporating a channel for carrying the slide to be viewed, said sleeve being provided with an opening whereby said slide may be inserted within said device while it is in collapsed condition within said sleeve.

10. In combination, a device for viewing translucent printed or pictorial slides, and a mailing sleeve therefor, said device being enclosed in collapsed condition within said sleeve, said device being fabricated from relatively rigid material and having a top, a bottom, a front wall, a back wall, and opposed end walls, said end walls being attached to said front and back wall but free of said top and bottom, each of said top and bottom overhanging said end walls and being bisected by a crease line extending longitudinally from its end to its end, each of said end walls being bisected by a crease line extending vertically from its top to its bottom, said front wall being in close adjacency to said back wall, each of said top, bottom and end walls being folded flat upon itself along said crease lines, said top and bottom being folded outwardly of said device, said end walls being folded inwardly of said device, said sleeve being wrapped about said device to maintain said back wall from being spread apart from said front wall, an elastic member extending between said top and bottom and urging each to unfold toward each other, said elastic member functioning upon removal of said sleeve from said device to cause said device to pop open to box-like condition, said front wall being provided with at least one lens-carrying aperture, said back wall being provided with at least one light-transmitting window, said back wall incorporating a channel for carrying the slide to be viewed, said sleeve being provided with an opening whereby said slide may be inserted within said device while it is in collapsed condition within said sleeve.

References Cited in the file of this patent

UNITED STATES PATENTS

| | | |
|---|---|---|
| 12,451 | Stull | Feb. 27, 1855 |
| 2,321,004 | Branson | June 8, 1943 |
| 2,662,442 | Gowland | Dec. 15, 1953 |

FOREIGN PATENTS

| | | |
|---|---|---|
| 1,842 | Great Britain | of 1855 |
| 550,917 | France | Dec. 22, 1922 |